United States Patent [19]

Byrnes

[11] 4,062,375
[45] Dec. 13, 1977

[54] TAMPER PROOF LOCK

[75] Inventor: Francis R. Byrnes, Philadelphia, Pa.

[73] Assignee: Center Compression Lock Company, Philadelphia, Pa.

[21] Appl. No.: 697,581

[22] Filed: June 18, 1976

[51] Int. Cl.$^2$ .......................... E03B 9/06; F16K 35/06
[52] U.S. Cl. .................................... 137/296; 74/89.15; 74/424.8 VA; 137/382.5; 251/278; 251/291; 251/337
[58] Field of Search ............... 137/296, 298, 377, 382, 137/382.5; 251/278, 291, 337; 74/89.15, 424.8 R, 424.8 VA

[56] References Cited
U.S. PATENT DOCUMENTS 3,532,109 10/1970 Smith ................................... 137/296

Primary Examiner—Alan Cohan
Assistant Examiner—Gerald A. Michalsky
Attorney, Agent, or Firm—Seidel, Gonda & Goldhammer

[57] ABSTRACT

A tamperproof lock for a fire hydrant. A spring is mounted at one end on the fire hydrant housing. Power transmitting means are mounted on a threaded operating rod extending within the housing chamber. The power transmitting means transmit power to the threaded rod against the spring. A swivel plate is freely mounted on the power transmitting means for rotational movement thereon. The swivel plate has a contoured hub portion adapted to fit within an aperture within the fire hydrant bonnet. The hub portion is exposed to the exterior of the bonnet. Power means for applying power substantially along the axis of the threaded rod to move the rod against the spring are removably mounted on the bonnet. Means for preventing axial and rotational movement of the power means is pivotably connected thereto by means of a double pivot joint.

11 Claims, 3 Drawing Figures

TAMPER PROOF LOCK

BACKGROUND OF THE INVENTION

The present invention is directed to a tamperproof lock for a fire hydrant. In particular, the invention is directed to a tamperproof lock comprising a series of parts which are easily assembled in combination with a subsisting fire hydrant. The lock is relatively inexpensive, simple and convenient to assemble, and is believed to be the first truly tamperproof lock for use with a fire hydrant. The lock can be sold in kit form to retrofit a subsisting hydrant.

There has been a long felt need for a tamperproof lock for a fire hydrant. The unauthorized use of fire hydrants has led to staggering losses of money and man-hours in attending to the readjustment of vandalized fire hydrants and their repair. Moreover, the unauthorized use of a fire hydrant may be extremely dangerous. Municipal reservoirs generally have a limited capacity to cope with the drainage posed by continuously open fire hydrants. Additionally, a vandalized hydrant may prove inoperable for emergency use.

Many attempts have been made to design a fire hydrant which is vandalproof. In general, these involve fresh designs for the entire hydrant and replacement of subsisting hydrants with completely new ones. Subsisting fire hydrants cannot be retrofitted conveniently to implement the proposed designs. Furthermore, the manufacture of a completely new fire hydrant is relatively costly. On a practical basis, these factors may render such designs useless. Accordingly, the vital problem of rendering subsisting fire hydrants tamperproof remains unsolved.

Apart from the practicalities of time and expense in implementing the designs of the prior art is the effectiveness of the design for the intended purpose: rendering the fire hydrant truly tamperproof. In general, prior art designs tend to be rather intricate and succeed only in making the fire hydrant somewhat more difficult to vandalize without actually achieving the goal of a fire hydrant which, for all intents and purposes, cannot be operated by unauthorized parties.

Various designs for valve locks and actuating mechanisms are disclosed in U.S. Pat. Nos. 3,070,115, 3,290,003, 3,361,154, 3,453,897, 3,456,679, 3,532,108, 3,532,109, 3,543,777, and 3,672,393. A fire hydrant with tamperproof features is disclosed in U.S. Pat. No. 3,532,109. The patent is directed to the new design of a bonnet, operating shaft and a screw jack or operating mechanism. The operating shaft is reciprocable within a bushing mounted with the interior of the bonnet. The end of the operating shaft and the bushing are accessible to the exterior of the bonnet. The bonnet is provided with a pair of holes which penetrate to the bushing surface. The screw jack includes a pair of spring-urged latches which are snapped apart and then positioned in the holes to retain the screw jack in an operative position.

Since the bushing is exposed, it apparently can be rotated, unscrewed and removed from the hydrant, providing access to the entire operating shaft. The exposed operating shaft might then be rotated and removed from the hydrant. In addition, once the bushing is removed, the interior of the housing is completely exposed and could be jammed with foreign matter and otherwise vandalized to render the hydrant inoperative.

Since the pair of bonnet holes penetrate to the bushing, the bushing could be deformed or otherwise vandalized to preclude operation of the shaft.

While the screw jack is mounted on the bonnet, the latches could be pried apart by an unauthorized party and the screw jack removed therefrom. Accordingly, the attendance of an authorized party would be required to continuously monitor the screw jack while it is mounted on the bonnet.

An advantage of the present invention is that it is truly tamperproof.

Another advantage of the invention is that is can be sold in kit form and used to retrofit a subsisting fire hydrant.

Another advantage of the invention is that the bulk of the components of a subsisting fire hydrant need not be re-designed or modified to implement the tamperproof lock.

A further advantage of the present invention is that the operating rod is inaccessible to the bonnet exterior.

A still further advantage of the invention is that the accessible portion of the lock is mechanically separated from the operating portion thereof so that the accessible portion of the lock can be hammered, chiseled or rotated without affecting the operating portion thereof.

A yet further advantage of the invention is that the means for exerting a force along the axis of the operating rod to reciprocate the rod can be locked on the hydrant bonnet and cannot be removed therefrom except by authorized personnel.

Other advantages appear hereinafter.

BRIEF SUMMARY OF THE INVENTION

A tamperproof lock for use in a fire hydrant including a bonnet having an aperture, a housing having an internal chamber and an internally threaded portion, a threaded operating rod extending within the housing chamber coupled to a yoke, and a plunger coupled to the yoke for opening and closing a valve. The bonnet, housing, operating rod, yoke and plunger may be part of a subsisting fire hydrant. A spring is mounted at one end of the housing. Power transmitting means are threadedly mounted on the operating rod for transmitting power to the rod against the spring. A swivel plate is freely mounted on the power transmitting means for rotational movement thereon. The swivel plate has a contoured hub portion adapted to fit within the bonnet aperture. The contoured hub portion is exposed to the exterior of the bonnet. Power applying means are removably mounted on the bonnet for applying power substantially along the axis of the operating rod to move the rod against the spring. The power applying means is provided with means for preventing axial and rotational movement thereof with respect to the bonnet.

For the purpose of illustrating the invention, there is shown in the drawings a form which is presently preferred; it being understood, however, that this invention is not limited to the precise arrangement and instrumentalities shown.

DETAILED DESCRIPTION OF THE INVENTION

Figure 1:
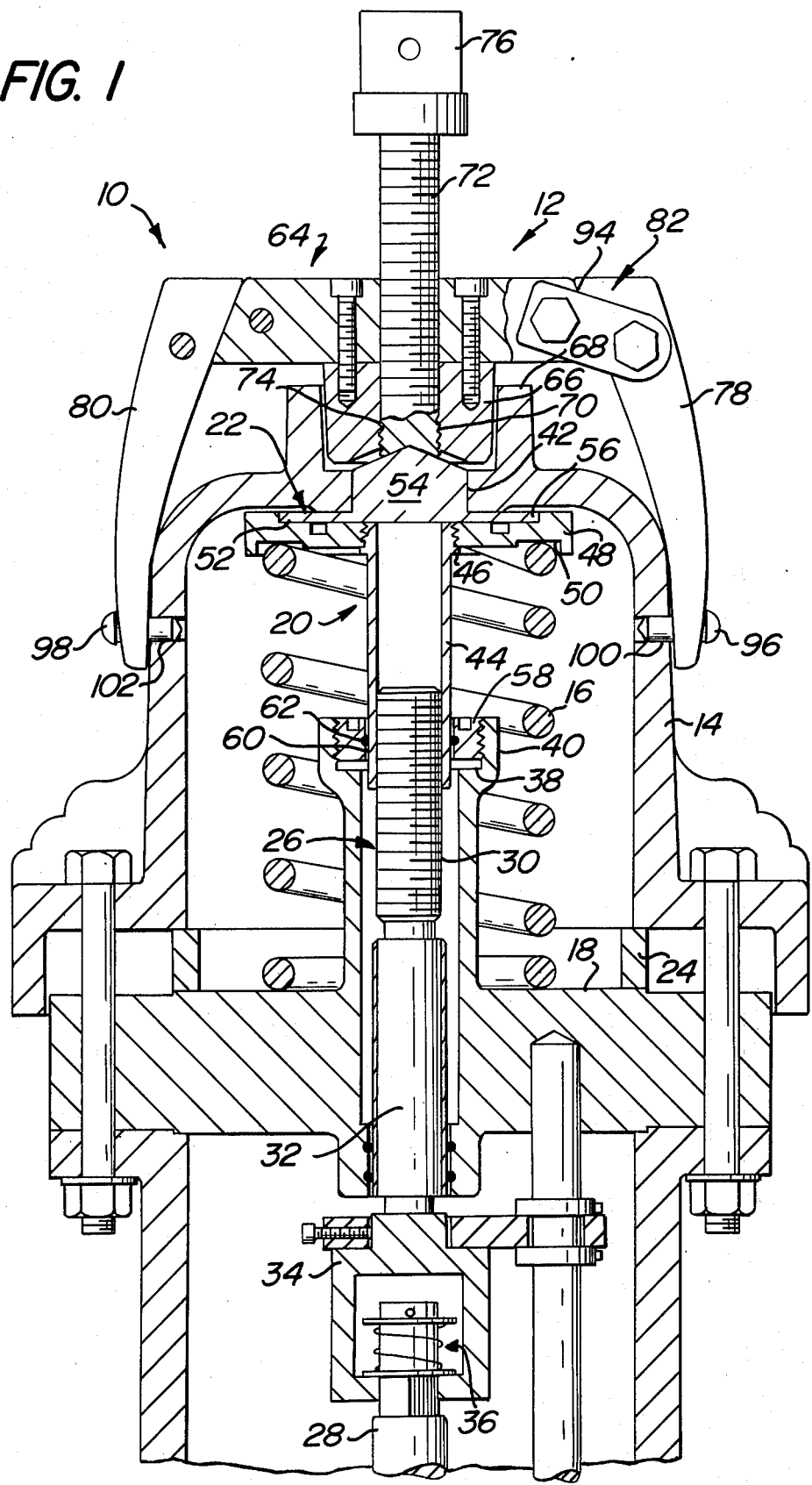
FIG. 1 is a cross-sectional view of a tamperproof lock constructed in accordance with the principles of the present invention.

Referring to the drawings wherein like numerals indicate like elements, there is shown in FIG. 1 a tamperproof lock operatively assembled in a fire hydrant designated generally as 10. The tamperproof lock is operated by power applying means 12 removably mounted on a bonnet 14. The lock comprises a helical spring 16 mounted on a housing 18, power transmitting means 20 adapted to engage the spring 16, and a swivel plate 22 mounted on the power transmitting means 20. The bonnet 14 and housing 18 are conventional parts of a subsisting fire hydrant such as the fire hydrant used in the city of Philadelphia. The bonnet 14 is bolted to the housing 18. In the preferred embodiment described herein, the bonnet and housing are spaced apart by an annular spacer element 24 as will be described more fully below.

A conventional yoke stem 26 is connected to a conventional plunger element 28 for operating the fire hydrant valve (not shown). The yoke stem includes a threaded operating rod 30, a sleeve 32 mounted on the rod, and a yoke 34. The plunger element 28 depends from the yoke 34 by means of a conventional washer and spring assembly 36. In the conventional hydrant, the threaded rod is a single piece steel forged construction and the sleeve is brass.

In the conventional fire hydrant, an operating nut (not shown) having an annular shoulder is seated on an annular shelf 38 in the interior of the neck portion 40 of housing 18. The operating nut is threadedly mounted on operating rod 30 and has a triangular nut top portion which extends through an aperture 42 in bonnet 14. The triangular nut is exposed to the bonnet exterior. A wrench (not shown) is fitted on the triangular nut and is rotated to operate the hydrant. Rotation of the operating nut in its seated position causes the operating rod 30 to advance downwardly to open the fire hydrant valve. To return the rod to its original position, the direction of rotation of the wrench is reversed. This causes the rod to advance upwardly thereby closing the fire hydrant valve.

Because the reciprocating movement of the yoke stem 26 is based on rotation of the exposed portion of the operating nut, the nut can easily be tampered with to open the hydrant valve. Thus, a chisel can be driven into the exposed triangular nut and the nut rotated to open the hydrant valve. Previously, to prevent tampering with the conventional operating nut, it has been necessary to completely redesign the hydrant. Thus, as disclosed in U.S. Pat. No. 3,532,109, the conventional hydrant bonnet can be replaced by a completely new design and a spring-loaded axial power mechanism inserted therein for reciprocating the operating rod. This approach is costly and, as previously described, is incapable of rendering the fire hydrant truly tamperproof since the operating rod itself would be exposed to the bonnet exterior and could easily be vandalized. As previously mentioned, the entire axial power mechanism could then be dismembered.

In the present invention, the operating portion of the lock is entirely hidden beneath the bonnet 14. The only accessible portion of the lock cannot be rotated or otherwise operated to cause the operating portion of the lock to open the fire hydrant valve.

Figure 3:
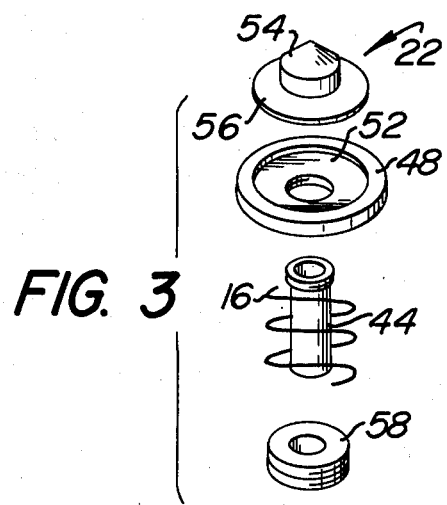
FIG. 3 is an exploded view of the lock components located within the hydrant bonnet.

The operating portion of the lock comprises the spring 16 and power transmitting means 20. See FIGS. 1 and 3. Preferably, the spring is calibrated at approximately 1000 lbs. per inch. The power transmitting means comprises an operating nut converter 44, a pressure plate 48 and a modified retaining ring 58. The operating nut converter is in the form of an internally threaded sleeve which is screwed on to operating rod 30. The converter has an externally threaded top portion located above an annular shoulder 46. A pressure plate 48 is threadedly mounted on the top portion of the operating nut converter and is seated on the annular shoulder 46.

The pressure plate 48 is provided with an annular recess 50 in its underside, which is adapted to engage one end of the spring 16. The top side of the pressure plate is provided with a circular recess 52. The swivel plate 22 is provided with a contoured hub portion 54 which fits in bonnet aperture 42 and is exposed to the exterior of the bonnet. The contoured hub portion is the only accessible portion of the lock. The swivel plate has a circular base portion 56 which fits within circular recess 52. In the preferred embodiment described herein, a solid film lubricant is interposed between the circular base portion of the swivel plate and the pressure plate 48. It is preferred that the operating nut converter be made of silicon bronze and the pressure and swivel plates be made of steel.

To retrofit the conventional fire hydrant with the tamperproof lock, it may be necessary to insert the annular spacer element 24 between the bonnet 14 and housing 18. The spacer element elevates the bonnet with respect to the housing to allow for travel of rod 30 in opening the hydrant valve.

To facilitate reciprocating motion of the operating nut converter 44 within the neck portion 40 of housing 18, the modified retaining ring 58 is threadedly mounted therein. The retaining ring is provided with a passage 60 and a rubber O-ring 62 for receiving the operating nut converter and facilitating reciprocating motion thereof.

The power applying means 12 exerts a force substantially along the axis of operating rod 30, causing the yoke stem 26 to advance downwardly against the return force exerted by spring 16. The downward movement of the yoke stem causes the plunger element 28 to open the fire hydrant valve. As the power applying means 12 is removed from the hydrant, spring 16 gradually returns the pressure plate 48 and yoke stem 26 back to their original positions to close the valve.

Figure 2:
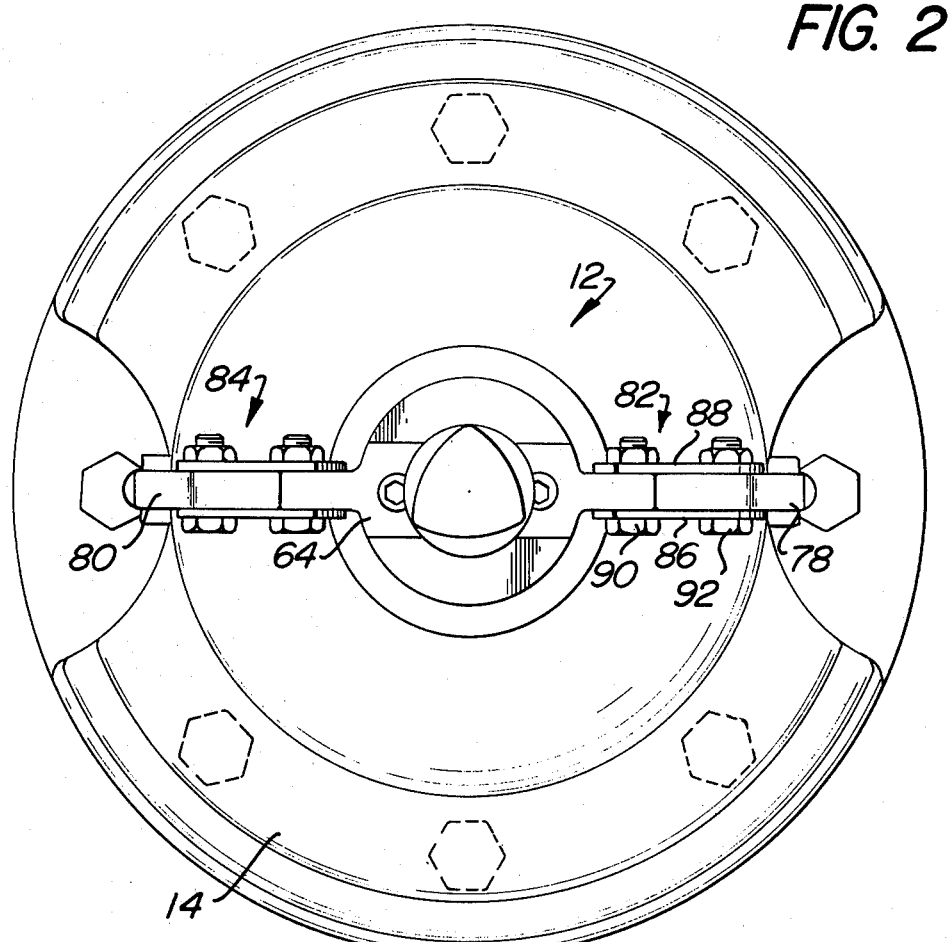
FIG. 2 is a plan view of the power transmitting means mounted on the bonnet.

The power applying means 12 is removably mounted on the bonnet 14 to operate power transmitting means 20 and yoke stem 26 to open the hydrant valve. See FIGS. 1 and 2. Power applying means 12 includes a collar 64 with a boss-like member 66 which fits within a circular wall 68 at the top of bonnet 14. The collar is provided with a threaded passage 70. A screw member 72 having a conically shaped recess 74 at one end and a triangular nut 76 at the other end threadedly engages collar passage 70. The conically shaped recess 74 is adapted to matingly contact the contoured hub portion 54 of swivel plate 22. The screw member 72 can be advanced in passage 70 by fitting a conventional wrench on triangular nut 76 and rotating the wrench.

A pair of arms 78 and 80 are pivotably connected to the collar 64 via locking means 82 and 84, respectively. Locking means 82 and 84 are identical as are arms 78 and 80. Accordingly, only interconnection of collar 64, locking means 82 and arm 78 will be described herein, it being understood that collar 64, locking means 84 and arm 80 are interconnected in an identical fashion.

Locking means 82 comprises a pair of pivot plates 86 and 88 which are pivotably bolted to collar 64 and arm 78 by means of bolts 90 and 92, respectively. The locking means 82 provides a double pivot joint for arm 78. The arm is provided with a contoured surface 94 which is shaped so as to maintain flush contact with an associated portion of the exterior surface of collar 64 when the power applying means is locked on the bonnet 14.

The arms 78 and 80 are provided with pins 96 and 98, respectively. The pins fit in a pair of opposed holes 100 and 102 which are drilled in bonnet 14. The pair of holes 100 and 102 represents the only modification of the fire hydrant bonnet required to practice the preferred embodiment of the invention described herein. Thus, the conventional hydrant bonnet need not be replaced or otherwise substantially modified to implement the tamperproof lock.

The power applying means 12 is mounted on bonnet 14 by inserting pins 96 and 98 in place in holes 100 and 102. The boss-like member 66 is inserted within the circular bonnet wall 68. The screw member 72 is advanced within passage 70 to bring it into mating contact with the contoured hub portion 54 of swivel plate 22. As the screw member 72 advances further within passage 70, the boss-like member 66 rises slightly and the contoured surfaces of arms 78 and 80 facing collar 64 contact associated portions of the exterior surface of the collar in a substantially flush manner to rigidly lock pins 96 and 98 into holes 100 and 102.

Further rotation of the screw member 72 causes the member to advance within passage 70 and bear against the contoured hub portion 54 of swivel plate 22. The downward force applied through screw member 72 is transmitted by power transmitting means 20 to the yoke stem 26 to displace the plunger 28 downwardly and open the hydrant valve. As the yoke stem 26 is displaced downwardly by power applying means 12, spring 16 exerts an upward return force against the underside of pressure plate 48.

When the underside of the pressure plate contacts the neck portion 40 of housing 18, equal forces are exerted on the neck portion 40 by the pressure plate and on the bonnet 14 and collar 64 by arms 78 and 80. Any attempt to pry the arms 78 and 80 apart will be fruitless as the arms and collar remain in substantially flush contact along the contoured surface of the arms. Thus, the collar 64 cannot be moved axially or rotationally while the power applying means is rigidly locked to the bonnet.

To remove power applying means 12 from bonnet 14, screw member 72 must be rotated so that the member travels upwardly in passage 70. The return force exerted by spring 16 is transmitted through power transmitting means 20 to yoke stem 26, causing the yoke stem to travel upwardly towards its original rest position. When the contoured portion 54 of swivel plate 22 is returned to its original position flush against bonnet 14 within aperture 42, the yoke stem 26 and plunger 28 maintain the hydrant valve closed. Further rotation of the screw member 72 in contact with the contoured hub portion 54 of swivel plate 22 causes the boss-like member 66 to drop slightly, thereby releasing arms 78 and 80 from substantially flush contact therewith. The arms can then be pivoted outwardly from the bonnet 14 and the entire power applying means 12 can then be lifted off the bonnet.

In operation, the power trasmitting means 12 must be kept rigidly locked on bonnet 14 to maintain the hydrant valve open against the return force of spring 16. Since the power transmitting means will automatically lock in rigid fashion on the bonnet 14, the hydrant, with the power transmitting means locked thereon, can be left unattended without danger of unauthorized removal of the power transmitting means when the conventional wrench is removed therefrom.

When the fire hydrant valve is closed, the contoured hub portion 54 of swivel plate 22 is the only surface of the tamperproof lock which is accessible to the bonnet exterior. If an unauthorized party attempts to rotate the contoured hub portion, the swivel plate will rotate freely within circular recess 52 and pressure plate 48. The power transmitting means 20 will then transmit no power to the yoke stem 26, precluding operation of the hydrant valve. The only practical way to operate the fire hydrant valve is through operation of the power applying means 12. The lock therefore is truly tamperproof.

The present invention may be embodied in other specific forms without departing from the spirit or essential attributes thereof and, accordingly, reference should be made to the appended claims, rather than to the foregoing specification as indicating the scope of the invention.

I claim:

1. In a fire hydrant including a bonnet having an aperture, a housing having an internal chamber, a threaded operating rod extending within the housing chamber coupled to a yoke, and a plunger coupled to the yoke for opening and closing a valve, a tamperproof lock comprising:
   a spring mounted at one end on a housing;
   power transmitting means threadedly mounted on a threaded operating rod extending within a housing chamber for transmitting power to said threaded rod againt said spring; and
   a swivel plate freely mounted on said power transmitting means for rotational movement thereon, said swivel plate having a contoured hub portion adapted to fit within a bonnet aperture, said hub portion being exposed to the exterior of the bonnet.

2. The tamperproof lock according to claim 1 including power applying means removably mounted on the bonnet for applying power substantially along the axis of the operating rod to move the operating rod against said spring, said power applying means comprising a collar having a passage, means reciprocable in said collar passage for contacting said swivel plate hub portion to apply power to said power transmitting means, locking means pivotably connected to said collar, means pivotably connected to said locking means for preventing axial and rotational movement of said collar, said preventing means having a contoured portion for substantially flush contact with the exterior of said collar, said preventing means being adapted for removable coupling to the exterior of the bonnet.

3. The tamperproof lock according to claim 2 wherein said means reciprocable in said collar passage is adapted to matingly contact said swivel plate hub portion.

4. The tamperproof lock according to claim 1 wherein a solid film lubricant is interposed between said swivel plate and power transmitting means.

5. In a fire hydrant including a housing having an internal chamber and an internally threaded portion, a threaded operating rod extending within the housing chamber coupled to a yoke, and a plunger coupled to the yoke for opening and closing a valve, the combination comprising:
- a modified retaining ring threadedly mounted on an internally threaded portion of a housing;
- an operating nut converter threadedly mounted on a threaded operating rod extending within a housing chamber;
- a pressure plate threadedly mounted on said operating nut converter, said pressure plate having an annular recess formed in its underside and a circular recess formed in its topside;
- a swivel plate freely mounted in said pressure plate circular recess for rotational movement therein, said swivel plate having a conically shaped central hub portion; and
- a spring mounted at one end on the housing and adapted to fit at the other end within said pressure plate annular recess whereby said spring exerts an upward force against the underside of said pressure plate.

6. The combination according to claim 5 including a bonnet coupled to the housing, said bonnet having an aperture for receiving said conically shaped central hub portion of said swivel plate and a wall provided with a pair of holes in the exterior thereof, and means removably mounted on said bonnet for exerting a force substantially along the axis of the operating rod to move the rod against said spring, said exerting means comprising a screw member having a nut at one end and a conically shaped recess at the other end, said screw member being adapted to matingly contact said conically shaped central hub portion of said swivel plate, a collar having an internally threaded passage for threadedly engaging said screw member to permit said screw member to move reciprocatingly therein, locking means pivotably connected to said collar at opposed ends thereof, a pair of arms pivotably connected to said locking means at opposed ends of said collar, each of said arms having a pin adapted to fit securely within one of said bonnet wall holes and a contoured portion for substantially flush contact with the exterior of said collar to prevent axial and rotational movement of said collar.

7. The combination according to claim 5 wherein a solid film lubricant is interposed between said swivel plate and pressure plate circular recess.

8. In a fire hydrant including a bonnet having an aperture, a housing having an internal chamber, a threaded operating rod extending within the housing chamber coupled to a yoke, and a plunger coupled to the yoke for opening and closing a valve, a tamperproof lock comprising:
- a spring mounted at one end on a housing;
- power transmitting means threadedly mounted on a threaded operating rod extending within a housing chamber for transmitting power to said threaded rod against said spring;
- a swivel plate freely mounted on said power transmitting means for rotational movement thereon, said swivel plate having a contoured hub portion adapted to fit within a bonnet aperture, said hub portion being exposed to the exterior of the bonnet; and
- power applying means removably mounted on the bonnet for applying power substantially along the axis of the operating rod to move the rod against said spring by contacting the contoured hub portion of said swivel plate.

9. In a fire hydrant including a housing having an internal chamber and an internally threaded portion, a threaded operating rod extending within the housing chamber coupled to a yoke, and a plunger coupled to the yoke for opening and closing a valve, the combination comprising:
- a modified retaining ring threadedly mounted on an internally threaded portion of a housing;
- an operating nut converter threadedly mounted on a threaded operating rod extending within a housing chamber;
- a pressure plate threadedly mounted on said operating nut converter, said pressure plate having an annular recess formed in its underside and a circular recess formed in its topside;
- a swivel plate freely mounted in said pressure plate circular recess for rotational movement therein, said swivel plate having a conically shaped central hub portion;
- a spring mounted at one end on the housing and adapted to fit at the other end within said pressure plate annular recess;
- a bonnet coupled to the housing, said bonnet having an aperture for receiving said conically shaped central hub portion of said swivel plate and a wall provided with a pair of holes in the exterior thereof; and
- means removably mounted on said bonnet for exerting a force substantially along the axis of the operating rod to move the rod against said spring by contacting the central hub portion of said swivel plate.

10. Apparatus, comprising:
- a bonnet;
- a housing coupled to said bonnet having an internal chamber;
- a threaded operating rod extending within said housing chamber;
- a spring mounted at one end on said housing;
- power transmitting means threadedly mounted on said operating rod for transmitting power to said rod against said spring; and
- swivel means rotatably mounted on said power transmitting means, said swivel means having a contoured portion exposed to the exterior of said bonnet.

11. Apparatus according to claim 10 including power applying means removably mounted on said bonnet for applying power substantially along the axis of the operating rod to move the rod against said spring by contacting the contoured portion of said swivel means.

* * * * *